United States Patent [19]

Sizer, II et al.

[11] Patent Number: 5,345,529

[45] Date of Patent: Sep. 6, 1994

[54] METHOD FOR ASSEMBLY OF AN OPTICAL FIBER CONNECTIVE DEVICE

[75] Inventors: Theodore Sizer, II, Little Silver; James A. Walker, Howell, both of N.J.

[73] Assignee: AT&T Bell Laboratories, Murray Hill, N.J.

[21] Appl. No.: 88,687

[22] Filed: Jul. 6, 1993

[51] Int. Cl.⁵ .................................. G02B 6/36
[52] U.S. Cl. ........................... 385/147; 385/76; 385/85; 385/88; 359/900
[58] Field of Search ............ 385/56, 59, 63, 71, 385/76, 77, 78, 85, 88, 89, 95, 115, 120, 134, 139, 147, 901; 359/900

[56] References Cited

U.S. PATENT DOCUMENTS

| | | | |
|---|---|---|---|
| 3,829,316 | 8/1974 | Huber et al. | 96/36.2 |
| 3,872,236 | 3/1975 | Swengel, Sr. et al. | 385/147 |
| 4,038,488 | 7/1977 | Lin | 174/52 |
| 4,245,273 | 1/1981 | Feinberg et al. | 361/382 |
| 4,310,974 | 1/1982 | Gdovin et al. | 385/76 |
| 4,462,534 | 7/1984 | Bitaillou et al. | 228/180 |
| 4,917,448 | 4/1990 | Oppenheimer | 385/147 |
| 5,185,846 | 2/1993 | Basavanhally et al. | 385/77 |

Primary Examiner—Rodney B. Bovernick
Assistant Examiner—John Ngo
Attorney, Agent, or Firm—John A. Caccuro

[57] ABSTRACT

An optical fiber connective device enables one or more optical fiber(s) to be precisely mounted, essentially perpendicular, to a substrate. The connective device includes a support plate having holes with optical fiber(s) precisely mounted there through. The support plate, with mounted optical fiber(s), is then inserted into aligned holes in the substrate and attached to the substrate. The precise mounting of the connective device to the substrate enables optional coupling of optical signals from the optical fiber(s) to optoelectronic chips mounted over holes of the substrate.

14 Claims, 2 Drawing Sheets

5,345,529

METHOD FOR ASSEMBLY OF AN OPTICAL FIBER CONNECTIVE DEVICE

RELATED APPLICATION

Related subject matter is disclosed in the following application filed concurrently herewith and assigned to the same Assignee hereof: United States patent application Ser. No. 08/088,688 entitled "An Arrangement for Interconnecting An Optical Fiber to an Optoelectronic Component," inventors Theodore Sizer, II and James Albert Walker.

TECHNICAL FIELD

This invention relates to optical connective devices and, more particularly, to a method of an apparatus for mounting a fiber to a substrate.

BACKGROUND OF THE INVENTION

Increasingly, optical fibers are being used to provide optical communication connections between circuit chips and circuit boards. In some arrangements, an optical fiber is mounted perpendicular to optoelectronic chips mounted on a substrate, such as disclosed in our above-identified co-pending U.S. patent application. In such an arrangement, care must be taken to prevent "z" axis alignment problems, whereby a jagged end of an optical fiber contacts and possibly damages optoelectronic chips to which it is to couple signals. This invention is directed to an improved method of connecting optical fibers perpendicular to a substrate so as to eliminate the z axis alignment problems with optoelectronic chips mounted on the substrate.

SUMMARY OF THE INVENTION

In accordance with the present invention, a connective device for, and a method of, precisely mounting one or more optical fibers to a substrate overcomes the above-described z-axis alignment problems. More particularly, one or more optical fibers are inserted through aligned holes of a support plate and a dummy substrate, the dummy substrate having a thickness which is a predetermined ratio of the thickness of the first substrate. The length of the optical fiber(s) are then shortened (e.g., cut, ground-down, polished, etc.) to essentially coincide with a first surface of the dummy substrate and then are mounted (e.g., glued) to the support plate. Thereafter, the support plate with the mounted fiber(s) is removed from the dummy substrate, inserted into aligned holes of the first substrate and the support plate attached (e.g., glued) to the first substrate.

In an alternate arrangement, a stop plate is used to determined when the proper insertion of the fiber(s) through the support plate/dummy substrate has been completed. The fiber(s) are then mounted to the support plate, removed from the dummy substrate and then inserted and attached to the first substrate.

The precise mounting of the connective device to the substrate enables optional coupling of optical signal from the optical fiber(s) to optoelectronic chips mounted over the holes of the substrate.

DETAILED DESCRIPTION

Figure 1:
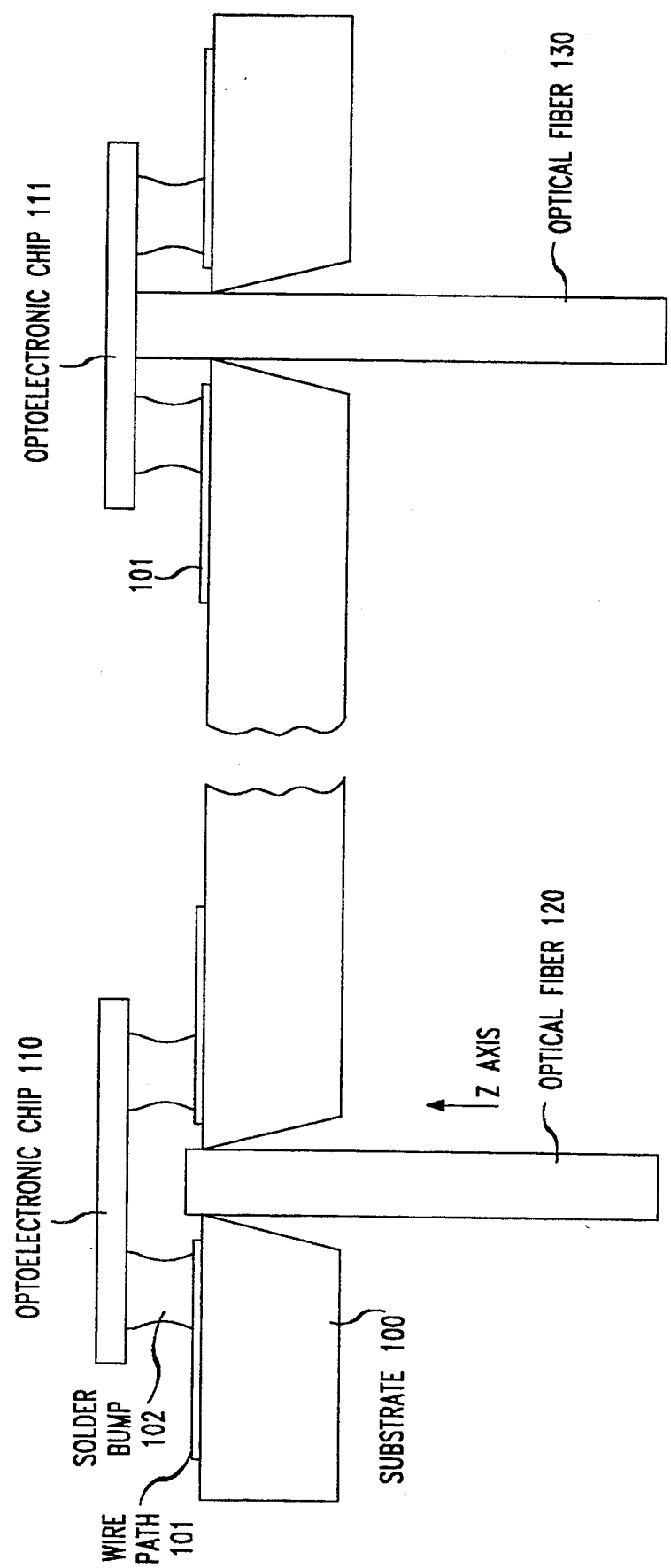
FIG. 1 shows the importance of z-axis positioning in the mounting of optical fibers to a substrate.

The drawings of FIGS. 1 and 2 are not necessarily to scale and certain details have been simplified to aid in clarity of the description.

Shown in FIG. 1 is an arrangement for interconnecting an optical fiber, such as 120 and 130, to a multichip module substrate 100. The substrate 100 may include a plurality optoelectronic flip-chips such as 110 and 111 that are solder bump bonded to wire path 101. The optoelectronic chips 110 and 111 connect via the various wire paths 101 to implement the desired circuit function. The importance of z axis positioning of the optical fibers can be seen by a comparison between the mounting of optical fiber 120 and optical fiber 130. Optical fiber 120 is mounted to substrate 100 such that the optical fiber end does not come in contact with the optoelectronic chip 110. This is desirable because the edge of the optical fiber may be jagged and, if it contacts optoelectronic chip 110, can cause damage to the chip 110. This is illustrated by optical fiber 130 which is shown to make contact with optoelectronic chip 111. The jagged edge of optical fiber 130 can gouge optoelectronic chip 111 causing it to malfunction. The ability to accurately align optical fibers 110 and 111 in the z-axis, with substrate 100 remains as a problem.

Figure 2A:
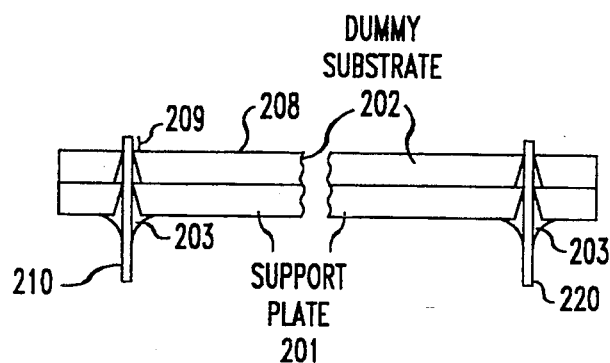
FIGS. 2A-2D show an assembly of an optical fiber connection to a substrate in accordance with the present invention.
Figure 2B:
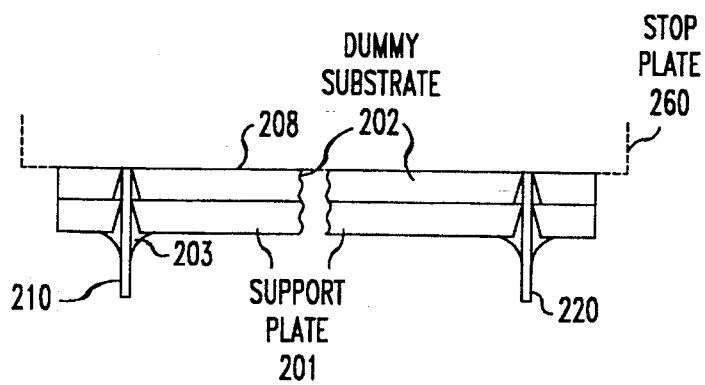
Figure 2C:
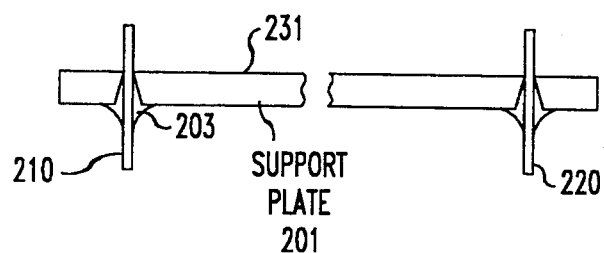
Figure 2D:
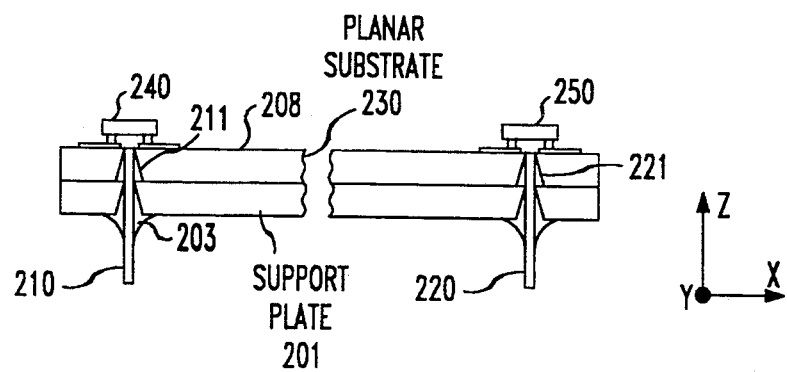

With reference to FIG. 2d there is illustrated a method of mounting the optical fiber connective device, of the present invention, (including a support plate 201 and one or more mounted optical fibers 210 and 220) to a substrate 230. As shown in FIG. 2a, the method includes the step of inserting optical fibers 210 and 220 through aligned holes of a support plate 201 and a dummy substrate 202. The optical fibers 210 and 220 are inserted so that they extend beyond the dummy substrate as is shown by 209. To facilitate the insertion of the optical fibers through the support plate and dummy substrate, both the support plate and dummy substrate may have their holes either etched or taper-drilled there through. The support plate 201 may be substantially the same size and be made of the same material as the dummy substrate 202. In fact, support plate 201, dummy substrate 202 and planar substrate 230 may all be substantially the same size and made of the same material. The support plate 201, dummy substrate 202, and planar substrate 230 may all have the holes chemically etched in their respective materials. In such an arrangement, a common mask can be used to define the holes in both the support plate 201, dummy substrate 202 and planar substrate 230. Materials which can be used for support plate 201, dummy substrate 202 and planar substrate 230 include a Fotoform™ glass (trademark of Corning Glass) which can be etched. The Fotoform material is photo-patternable via exposure to UV light and subsequent chemical etching. A high precision mask is used to form the desired hole pattern in the Fotoform glass. This process is well known and is not discussed further herein. In FIG. 2a, after the optical fibers 210 and 220 are inserted through the aligned holes in both the support plate 201 and dummy substrate 202, they are epoxied into the holes of support plate 201 illustrated by 203.

In FIG. 2a, the length 209 of the end of optical fibers 210 and 220 is shortened by either cutting, cleaving or some other technique. Thereafter, the dummy substrate 202 is placed in a polishing jig and the optical fiber ends are optically polished until the optical fiber ends are flat with the surface 208 of dummy substrate 202. Thereafter, the support plate 201 with the mounted stubs of optical fibers 210 and 220 can be removed from the dummy substrate 202. The support plate 201 with the mounted optical fibers 210 and 220 would then appear as is shown in FIG. 2c.

Shown in FIG. 2d is the final arrangement after the support plate 201 with the mounted optical fibers 210 and 220 have been inserted into the aligned holes 211 and 221 of the substrate 230. The support plate 201 is then attached to the substrate 230. This is accomplished by either clamping or gluing the support plate 201 to substrate 230. Gluing may be most advantageously performed by first applying the epoxy or glue to the surface 231 of support plate 201 as shown in FIG. 2c and then inserting the support plate with the optical fibers 210 and 220 mounted into holes 211 and 221 of the substrate 230.

As shown in FIG. 2d the optical fibers 210 and 220 both have a precise x and y axis (perpendicular to x and z axis) alignment with regard to optoelectronic chip 240 and 250, respectively. Because the optical fibers 210 and 220 have been epoxied to support plate 201, their position when inserted into substrate 230 is fixed and uniform. Moreover, because of the present invention, the z axis alignment of the optical fibers 210 and 230 are also precise and aligned relative to optoelectronic chips 240 and 250 of planar substrate 230.

In an alternative embodiment, in FIG. 2b a stop plate 260 (shown in dotted lines) may be used to determine when the insertion of the optical fibers should be stopped. Thereafter, an optical polishing step may be used to polish the optical fiber end flat with the surface 208 of dummy substrate 202. When multiple optical fibers have to be mounted to the support plate 201, some arrangement has to be made to insure that the optical fibers have approximately the same length; otherwise different optical fibers may first engage the stop plate 260.

While the substrate material utilized herein has been described as glass or ceramic, other photographically fabricated materials such as semiconductor materials may also be utilized.

What has been described is merely illustrative of the application of the principles of the present invention. Other arrangements and methods can be implemented by those skilled in the art without departing from the spirit and scope of the present invention.

What is claimed is:

1. A method of mounting one or more fibers to a planar substrate, comprising the steps of
    inserting said fibers through aligned holes of a support plate and a dummy substrate, a thickness of said dummy substrate having a predetermined ratio to a thickness of said planar substrate,
    shortening the length of said fibers to a first surface of said dummy substrate,
    mounting said fibers to said support plate,
    removing said support plate with mounted fibers from said dummy substrate,
    inserting said fibers into aligned holes of said planar substrate, and
    attaching said support plate to said planar substrate.

2. The method of claim 1 wherein said shortening step includes the step of cutting the length of said fibers at said first surface.

3. The method of claim 2 wherein said shortening step further includes the step of polishing said cut fibers at said first surface.

4. The method of claim 1 wherein said mounting step includes the step of gluing said fibers to said support plate.

5. The method of claim 1 wherein said dummy substrate is substantially identical in size to said planar substrate.

6. The method of claim 1 wherein said inserting step includes the step of using a stop plate to determine when to stop said inserting step.

7. The method of claim 1 wherein said support plate is substantially identical in size to said planar substrate.

8. The method of claim 1 wherein said dummy substrate and said planar substrate are made from the same material.

9. The method of claim 1 wherein said attaching step includes the step of gluing said mounting plate to said planar substrate.

10. The method of claim 1 wherein said holes are etched in said planar substrate, and wherein the fibers are inserted into a surface of said planar substrate having the larger hole openings.

11. The method of claim 1 wherein said holes are etched in said planar substrate, and wherein the fibers are inserted into a surface of said planar substrate having the smaller hole openings.

12. The method of claim 1 wherein said holes are taper-drilled in said planar substrate, and wherein the fibers are inserted into a surface of said planar substrate having the larger hole openings.

13. The method of claim 1 wherein said holes are etched in said dummy substrate, and wherein the fibers are inserted into a surface of said planar substrate and dummy substrate having the larger hole openings.

14. A method of mounting one or more fibers to a planar substrate, comprising the steps of
    inserting said fibers through aligned holes of a support plate and a dummy substrate until a predetermined stop position is reached,
    mounting said fibers to said support plate,
    removing said support plate with mounted fibers from said dummy substrate,
    inserting said fibers into aligned holes of said planar substrate, and
    attaching said support plate to said planar substrate.

* * * * *